United States Patent [19]

Akahori et al.

[11] Patent Number: 5,249,257

[45] Date of Patent: Sep. 28, 1993

[54] FUZZY REGRESSION DATA PROCESSING DEVICE

[75] Inventors: Hiroshi Akahori, Hirakata; Yo Egusa, Kyoto; Isao Hayashi, Toyonaka; Noboru Wakami, Hirakata, all of Japan

[73] Assignee: Matsushita Electric Industrial Co., Ltd., Osaka, Japan

[21] Appl. No.: 574,291

[22] Filed: Aug. 28, 1990

[30] Foreign Application Priority Data

Aug. 30, 1989 [JP] Japan ................................ 1-223546

[51] Int. Cl.⁵ ............................................ G06F 15/00
[52] U.S. Cl. .......................................... 395/3; 395/61; 395/900
[58] Field of Search ........................ 395/1, 3, 61, 900

[56] References Cited

PUBLICATIONS

"Linear Regression Analysis with Fuzzy Model", Hideo Tanaka et al., IEEE Transactions on Systems, Man, and Cybernetics, vol. SMC-12, No. 6, Nov./Dec. 1982, pp. 903-907.

Fuzzy Logic; IEEE Computer; Loffi Zadeh; Apr. 1988; pp. 83-93.

*Primary Examiner*—Allen R. MacDonald
*Attorney, Agent, or Firm*—Wenderoth, Lind & Ponack

[57] ABSTRACT

A fuzzy data processing device includes a data input portion for inputting data and first and second fuzzy regression model memories for storing first and second fuzzy regression models, respectively. In each fuzzy regression model, all coefficients are denoted as fuzzy values. A fitting degree calculator is provided to calculate a degree of fitting of the first fuzzy regression model to the second fuzzy regression model. A maximum detector detects the maximum of the calculated fitting degree. Thus, the estimated value ($y^*$) is obtained at which the maximum degree of the fitting of fuzzy values Yx and Yz, i.e., the grade peak point of the overlapping portion, is observed.

3 Claims, 7 Drawing Sheets

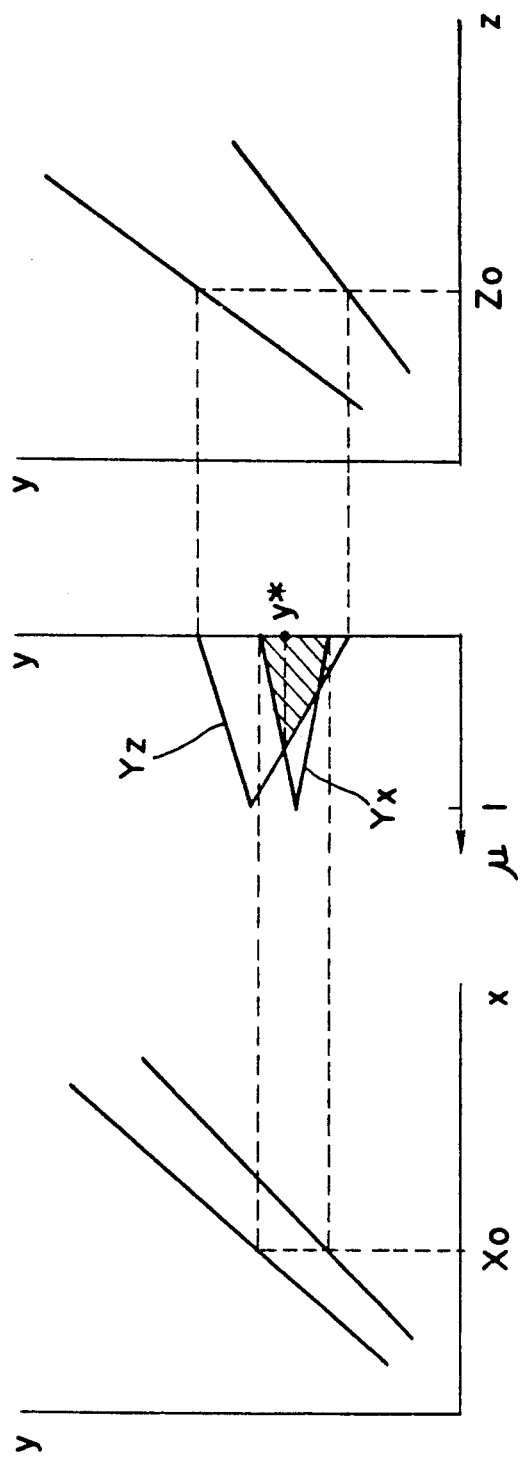

1

FUZZY REGRESSION DATA PROCESSING DEVICE

BACKGROUND OF THE INVENTION

1. Field of the Invention

The present invention relates to a fuzzy identification system for identifying the relationship between input and output data of a system from indefinite input and output data, and also relates to a fuzzy data processing device for processing indefinite and deviating data using an identified model.

2. Description of the Prior Art

Conventionally, the identification of a system from indefinite input/output data is realized by a fuzzy linear regression model, such as disclosed in an article "Linear Regression Model by Fuzzy Function" by H. Tanaka et al in Japanese Magazine "NIPPON KEIEI KOUGAKUSHI" vol. 25, 6, pp.162-174, 1982, or in an article "Linear Regression Analysis with Fuzzy Model" by H. Tanaka et al in IEEE TRANSACTIONS ON SYSTEMS, MAN, AND CYBERNETICS, VOL. SMC-12, NO. 6, NOVEMBER/DECEMBER 1982.

According to these articles, the deviations between the observed values and the estimated values in a system are taken up, and such deviations are considered to be due, not to the measurement errors, but to the indefiniteness of the system structure. Therefore, the system structure is represented by fuzzy linear functions whose parameters are given by fuzzy sets. For example, if the given data are expressed as:

$$(y_i, x_{i1}, \ldots, x_{in}).$$

wherein $i = 1, 2, \ldots, N$
provided that $y_i$ represents a value of the ith output variable, the fuzzy linear regression model can be formulated by the following steps.

(1) The fuzzy linear model is defined by the following equation:

$$Y_i = A_0 + A_1 x_{i1} + \ldots + A_n x_{in}$$

provided that the fuzzy coefficient $A_i$ has a triangle profile which is symmetrical with respect to the center line, and has a base with a width $C_i$.

(2) The fuzzy coefficient $A_i$ is so determined that the given data $(y_i, x_{i1}, \ldots, x_{in})$ are included within the estimated fuzzy value $Y_i$ having a degree greater than h.

(3) The fuzzy coefficient $A_i$ is so determined that the sum of the width of the estimated fuzzy value $Y_i$ is made minimum.

As described above, according to the prior art, the fuzzy linear regression model is formulated such that the fuzzy linear function having a fitting degree greater than a certain level with the minimum deviation is selected.

Next, a prior art example for estimating an output values with respect to inputs using regression models under two different conditions is explained. In this example, the regression models utilize multiple regression based on the method of least squares, and utilize the following two regression formulas with respect to two different conditions, respectively.

$$Y = b_0 + b_1 x_1 + \ldots + x_n \quad (1)$$

$$Y = c_0 + c_1 z_1 + \ldots + z_m \quad (2)$$

When the inputs obtained under two different conditions are $(x_1^0, \ldots, x_n^0)$ and $(z_1^0, \ldots, z_m^0)$, respectively, the estimated outputs Yx and Yz are obtained by substituting these inputs to formulas (1) and (2). From these two estimated outputs Yx and Yz, the final result $Y^*$ is obtained by taking an average between the two estimated outputs Yx and Yz, as shown below.

$$Y^* = (Yx + Yz)/2 \quad (3)$$

As understood from the foregoing, according to the prior art, an average is taken to obtain one result from two estimated values under two different conditions.

However, with the prior art fuzzy linear regression model, the deviations between the observed and estimated values are assumed to depend on the indefiniteness of the system structure, and thus, the system coefficients are assumed to be the fuzzy coefficients. The fuzzy coefficients are determined so as to have the fitting degree greater than a certain level with the minimum deviation. Therefore, the center of the fuzzy coefficient is always the center of the width of the fuzzy data, and is not related to the given data. Therefore, when the system is positively fluctuating, the information carried in each data may be lost.

Also, according to the prior art for estimating output values with respect to inputs using multiple regression models under two different conditions, average of the two estimated values is used as the final result. The reliability of each of the two estimated values is not always the same, but is forcibly assumed to be the same when the average is taken between the two estimated values. In other words, with the use of an average taking method, no consideration is taken to the reliability of each of the two estimated values. This results in a disadvantage in that when one of the two estimated values is abnormal while the other one is normal, the average of the two will contain abnormal information and further, it is not possible to detect the presence of such abnormal data.

SUMMARY OF THE INVENTION

The object of the present invention is therefore to provide an improved fuzzy identification system which can identify a system without losing the information contained in the data even when the system is fluctuating.

It is also an important object of the present invention to provide a fuzzy data processing device which can consider the reliability of each of two different sets of inputs obtained from two different conditions.

It is another object of the present invention to provide an fuzzy data processing device of the above described type which can detect abnormal input data.

In order to achieve the aforementioned object, a fuzzy identification system according to the present invention comprises: a regression portion for identifying a system by regressing an input/output data using a regression formula based on the method of least squares; and a fuzzy regression portion for rendering coefficients of the regression formula as fuzzy values in such a manner as to include all the input/output data around the regression formula.

Furthermore, a fuzzy data processing device according to the present invention comprises: a data input portion for inputting data; a first fuzzy regression model memory means for storing a first fuzzy regression model in which all coefficients of the fuzzy regression model are denoted as fuzzy values, and with all the data obtained under a first condition being included in the first fuzzy regression model; a second fuzzy regression model memory means for storing a second fuzzy regression model in which all coefficients of the fuzzy regression model are denoted as fuzzy values, and with all the data obtained under a second condition being included in the second fuzzy regression model; a fitting degree calculating means for calculating a degree of fitting of the first fuzzy regression model to the second fuzzy regression model; and a maximum detector for detecting the maximum of the calculated fitting degree, whereby an estimated value is obtained.

Moreover, an abnormal fuzzy data detecting device according to the present invention comprises: a data input portion for inputting data; a first fuzzy regression model memory means for storing a first fuzzy regression model in which all coefficients of the fuzzy regression model are denoted as fuzzy values, and with all the data obtained under a first condition being included in the first fuzzy regression model; a second fuzzy regression model memory means for storing a second fuzzy regression model in which all coefficients of the fuzzy regression model are denoted as fuzzy values, and with all the data obtained under a second condition being included in the second fuzzy regression model; a fitting degree calculating means for calculating a degree of fitting of the first fuzzy regression model to the second fuzzy regression model; and a fitting degree comparator for comparing the calculated fitting degree with a predetermined degree to detect an abnormal condition when the calculated fitting degree is smaller than the predetermined degree.

BRIEF DESCRIPTION OF THE DRAWINGS

These and other objects and features of the present invention will become clear from the following description taken in conjunction with the preferred embodiments thereof with reference to the accompanying drawings throughout in which like parts are designated by like reference numerals, and in which:

FIG. 6 is a graph showing a manner for obtaining an estimated value as carried out by the circuit of FIG. 4;

DETAILED DESCRIPTION OF THE PREFERRED EMBODIMENTS

Fuzzy Identification System

Figure 1:
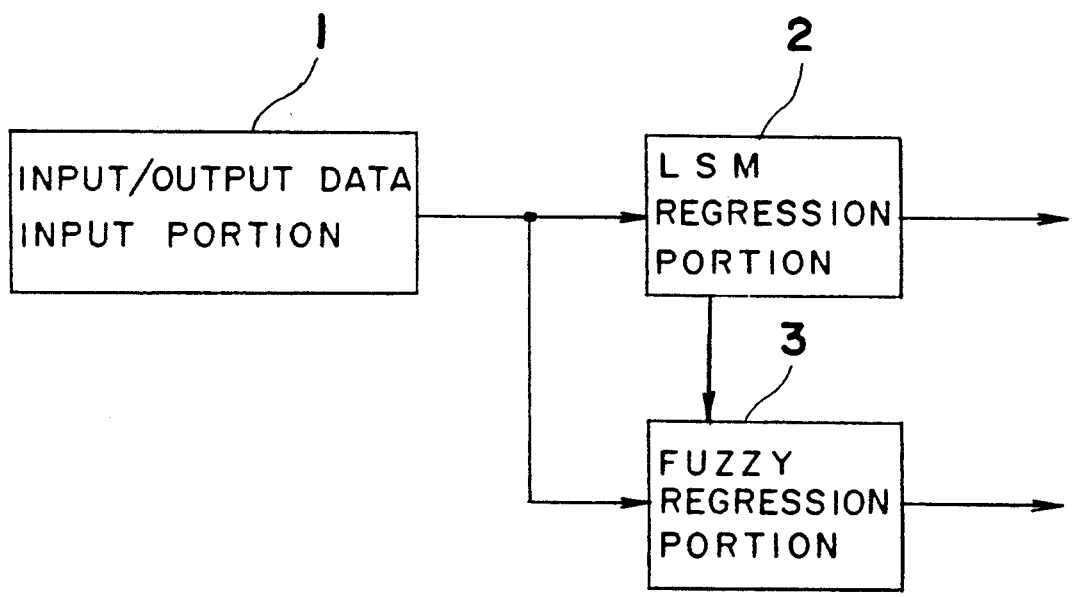
FIG. 1 is a circuit diagram of a fuzzy identification system according to the present invention.

Referring to FIG. 1, a fuzzy identification system according to the present invention is shown and comprises an input/output data input portion 1, a LSM (least square method) regression portion 2 using the method of least squares, and a fuzzy regression portion 3.

Input and output data are applied to, input/output data input portion 1, and are regressed in the LSM regression portion 2 by the method of least square. The input and output data are also regressed in a fuzzy regression portion 3 in consideration of the regression formulas used in the LSM regression portion 2 as being the center, and the coefficients of the regression formulas used in the LSM regression portion 2 being used as the fuzzy coefficients, with all the data included.

In other words, according to the fuzzy identification system of the present invention, a regression portion 2 is provided for identifying a system by regressing an input/output data using a regression formula based on the method of least squares, and a fuzzy regression portion 3 is provided for rendering coefficients of the regression formula as fuzzy values in such a manner as to include all the input/output data around said regression formula.

Further details of the fuzzy identification system of the present invention will be described below.

It is assumed that the data applied to input/output data input portion are:

$$(y_i, x_{i1}, \ldots, x_{in}).$$

wherein $i = 1, 2, \ldots, N$
and it is also assumed that:

$$X_i = (x_{i1}, \ldots, x_{in}).$$

In the LSM regression portion 2, the linear regression model is given by the equation below:

$$Y = a_0 + a_1 x_1 + \ldots + a_n x_n$$

which is determined by the following steps.

(1) A deviations between the estimated value $Y_i = \Sigma a_j x_{ij}$ of the input data $X_i$ and the output data $y_i$ are obtained.

(2) The deviations are squared and summed to obtain a sum S as expressed by the following equation:

$$S = \Sigma(y_i - Y_i)^2$$

(3) The coefficient $a_i$ is so selected as to minimize the sum S.

Figure 2:
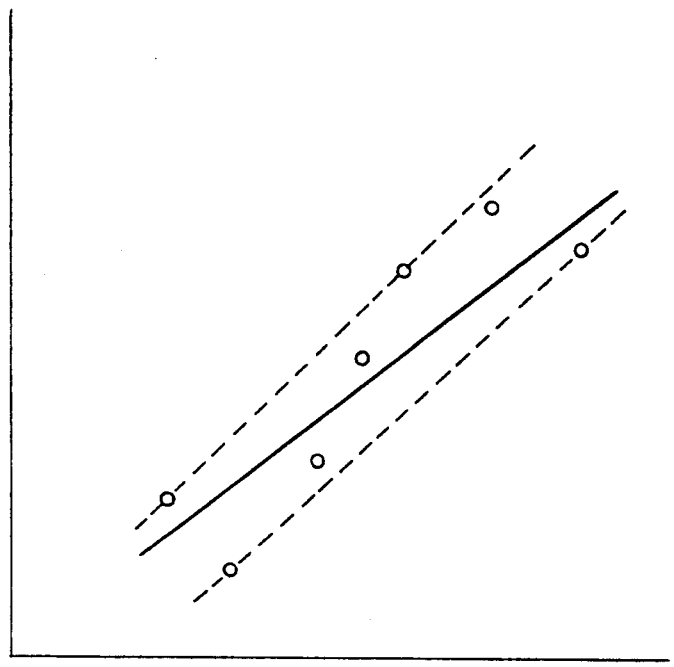
FIG. 2 is a graph showing a result of the regression carried out by the circuit of FIG. 1.

The regression formula of the regression model is shown in FIG. 2 by a solid line.

Figure 3:
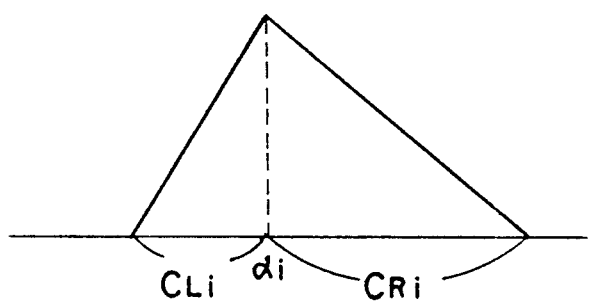
FIG. 3 is a graph showing a profile of a fuzzy coefficient of the regression formula used in the circuit of FIG. 1.

Next, the fuzzy regression portion 3 is described. In the fuzzy regression portion 3, the system model is given by the equation below:

$$Y = A_0 + A_1 x_1 + \ldots + A_n x_n$$

in which $A_i$ is the fuzzy coefficient, as shown in FIG. 3, and has a triangle formation centered at coefficient $a_i$ of the regression formula obtained in the LSM regression portion 2, with the width of the left portion being $C_{Li}$ and the width of the right portion being $C_{Ri}$. The widths $C_{Li}$ and $C_{Ri}$ are so determined as to include the input data $X_i$ with the estimated fuzzy $Y_i$ being greater than the degree h, and also to minimize the sum of the widths of the estimated fuzzy $Y_i$. In other words, widths $C_{Li}$ and $C_{Ri}$ are so determined as to minimize the following equations:

$$J_L = \Sigma C_{Li} x_i$$

and $$J_R = \Sigma C_{Ri} x_i.$$

As has been described above, according to the fuzzy identification system of the present invention, in order to fuzzy regress the system from the vague input and output data, the center value of the fuzzy coefficient is regressed by the method of least square, and the fuzzy regression is also effected so as to include all the data within the width. Thus, even if the system is definitely fluctuating, the information carried in the data can be utilized effectively.

Fuzzy Data Processing Device

Figure 4:
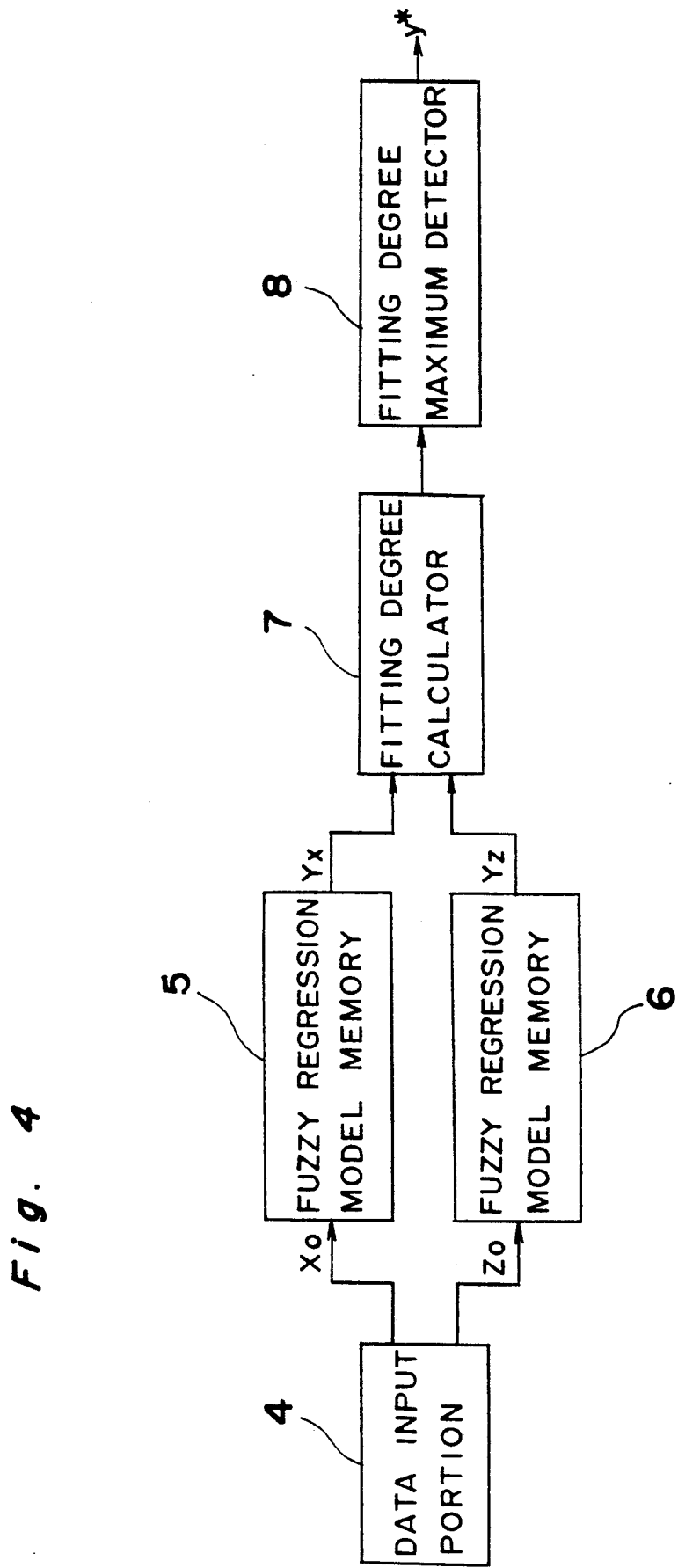
FIG. 4 is a circuit diagram of a fuzzy data processing device according to the present invention.
Figure 5A:
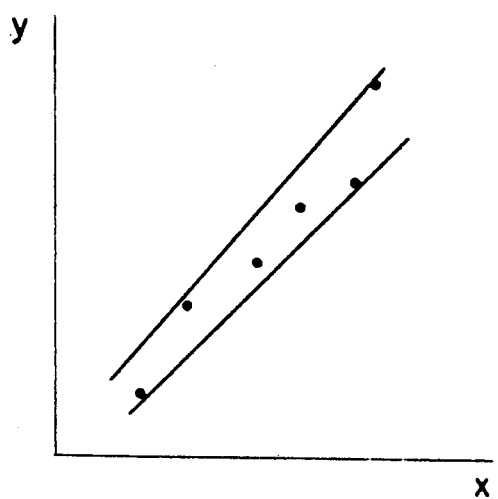
FIGS. 5a and 5b are graphs each showing a relationship between input and output data of the circuits employed in the circuit of FIG. 4.
Figure 5B:
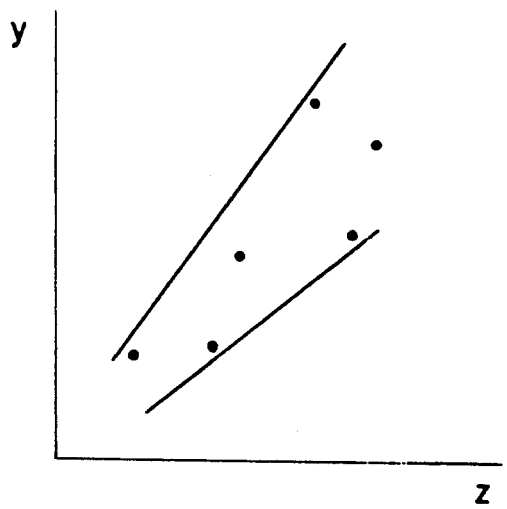

Referring to FIG. 4, a fuzzy data processing device according to the present invention is shown. In FIG. 4, a reference number 4 denotes a data input portion, 5 and 6 each denote a fuzzy regression model memory, 7 denotes a fitting degree calculator, and 8 denotes a fitting degree maximum detector. The fuzzy regression model memories 5 and 6 store different fuzzy regression models, such as shown in FIGS. 5a and 5b, in which FIG. 5a shows a relationship between input x and output y and FIG. 5b shows a relationship between input z and output y. Here, the fuzzy regression model can be either a regression model with the coefficient having a symmetrical fuzzy value as in the prior art or a regression model described above in connection with FIGS. 1, 2 and 3.

The input/output data obtained under two different conditions differs as shown in FIGS. 5a and 5b, and therefore, the reliability usually differs. For example, the data obtained according to the condition of FIG. 5a is such that the amount of data deviation is relatively small and therefore, the reliability of the obtained data is relatively high. On the contrary, the data obtained according to the condition of FIG. 5b is such that the amount of data deviation is relatively large, and therefore, the reliability of the obtained data is relatively low. According to the fuzzy regression, the reliability of the data is in relation to the width of the fuzzy coefficient.

Next, the steps for obtaining an estimated value $y^*$ are explained. Based on the input data $X_0$ and $Z_0$ applied to data input portion 4, fuzzy values Yx and Yz are obtained at fuzzy regression model memories 5 and 6, respectively. An example of the fuzzy values Yx and Yz are shown in FIG. 6.

In the fitting degree calculator 7, the select minimum calculation:

$$Y_x \wedge Y_z$$

is carried out, in which $\wedge$ indicates the calculation of taking the smaller one of Yx and Yz. Thus, the fitting degree calculator 7 produces the grade of the overlapping portion between the two fuzzy values Yx and Yz, as indicated by the shading in FIG. 6.

Then, in the fitting degree maximum detector 8, the estimated value $y^*$ is obtained at which the maximum of degree of the fitting of fuzzy values Yx and Yz, i.e., the grade peak point of the overlapping portion, is observed, by the following equation:

$$y^* = \sup_{y}[Y_x \wedge Y_z]$$

In this manner the final result $y^*$ is obtained.

Since two fuzzy models obtained under two different conditions are used for obtaining one fuzzy model in consideration of width of each fuzzy model, the reliability of the obtained fuzzy model can be expressed by the width of the fuzzy values of the obtained fuzzy model. Since the final result is obtained from the fitting degrees of the two fuzzy models, the combined fuzzy model is obtained within the one of the two fuzzy models that has a high reliability. Thus, the combined fuzzy model will have a high reliability.

As has been described above, according to the fuzzy data processing device of the present invention, the two fuzzy regression models under two different conditions are used to obtain one fuzzy regression model such that the maximum output of the fitting degree of the regression output from both fuzzy regression models is obtained. Thus, the preciseness of the estimation can be improved while considering the reliability of the two models.

Abnormal Fuzzy Data Detecting Device

Figure 7:
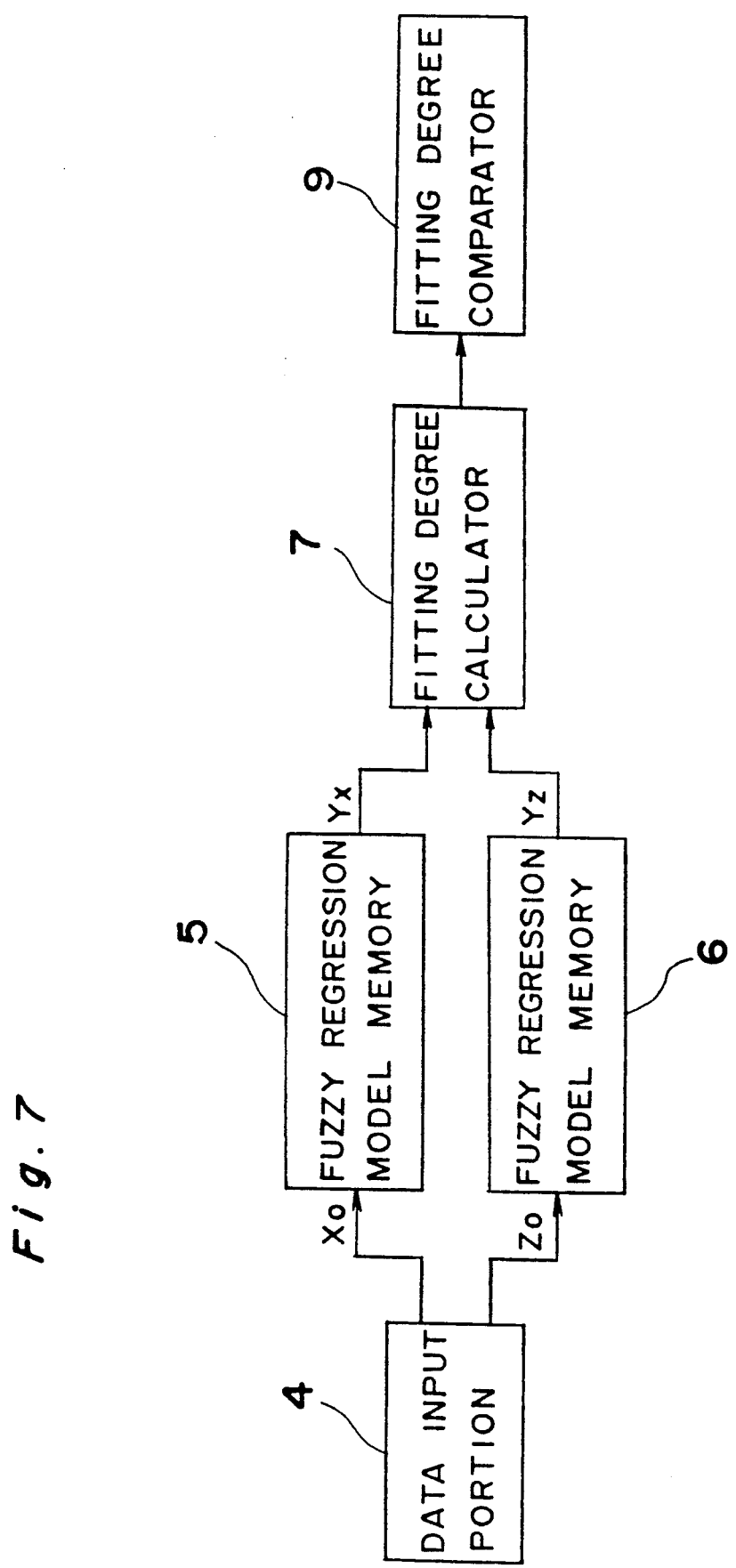
FIG. 7 is a circuit diagram of an abnormal fuzzy data detecting device according to the present invention.

Referring to FIG. 7, an abnormal fuzzy data detecting device according to the present invention is shown. When compared with the fuzzy data processing device shown in FIG. 4, the abnormal fuzzy data detecting device of FIG. 7 has a fitting degree comparator 9 instead of fitting degree maximum detector 8.

By the input data $X_0$ and $Z_0$, estimated values Yx and Yz are obtained at fuzzy regression model memories 5 and 6, respectively. Then, in the fitting degree calculator 7, the select minimum calculation is carried out, so as to produce a signal representing a lower level of the two levels Yx and Yz for every y.

In the fitting degree comparator 9, the peak point of the shaded portion is compared with a predetermined level. When the compared result is such that the peak point is less than the predetermined level, it is so determined that one of the two input data $X_0$ and $Z_0$ is abnormal. The detection of the abnormal data is further explained below.

Figure 8:
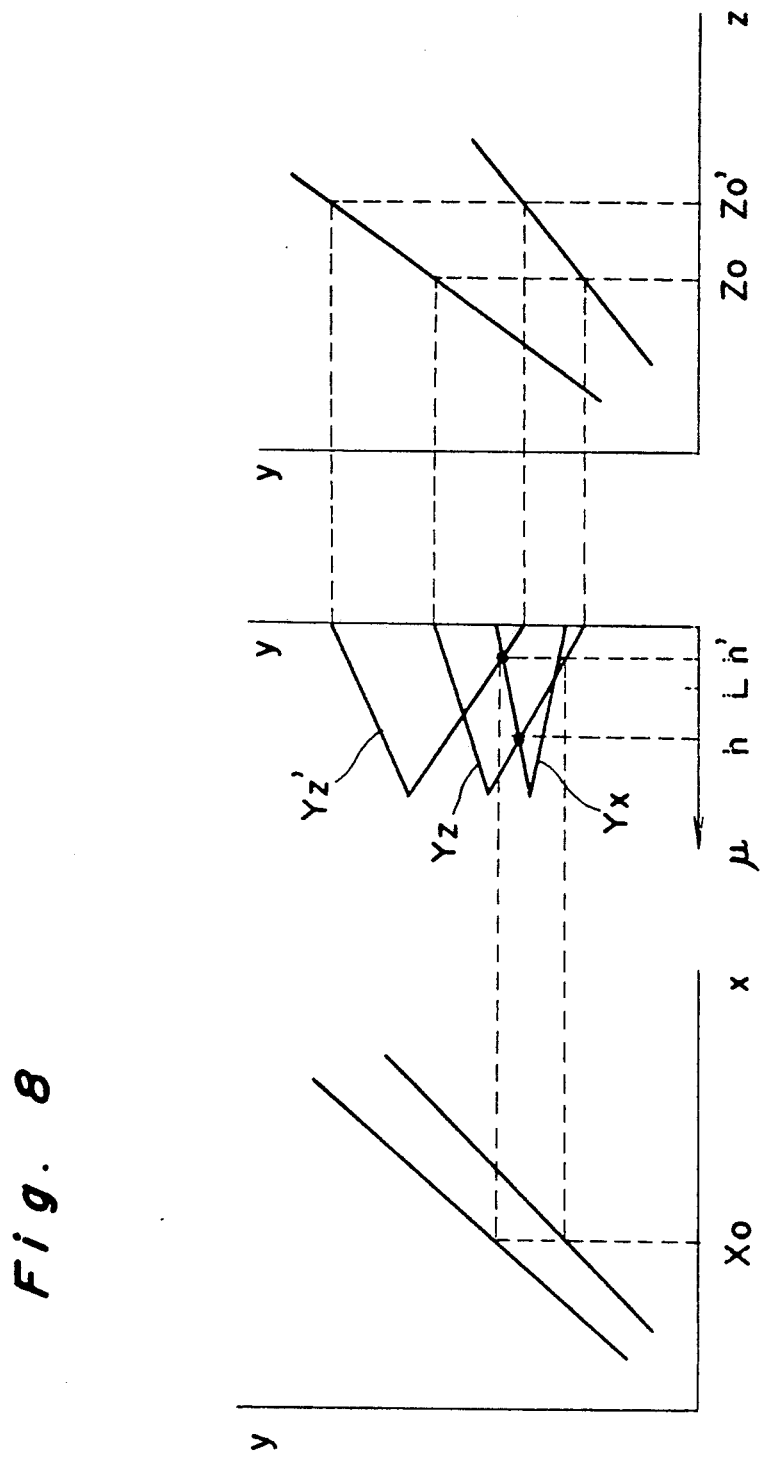
FIG. 8 is a graph showing a manner for detecting an abnormal condition.

Referring to FIG. 8, it is assumed that when inputs data $X_0$ and $Z_0$ are applied under two different, but normal conditions, fuzzy regression outputs Yx and Yz are obtained. Since input data $X_0$ and $Z_0$ are normal data, the maximum h of the degree of fitting of the fuzzy values Yx and Yz will be greater than a predetermined level L, such as 0.2. This is because the fuzzy regression outputs Yx and Yz are closely located to each other such that a high percentage of triangle areas of the fuzzy regression outputs Yx and Yz are overlapping.

It is also assumed that when input data $X_0$ and $Z_0'$ are applied under two different conditions with input data $Z_0'$ being obtained under an abnormal condition, fuzzy regression outputs Yx and Yz' are obtained. Since input data $Z_0'$ are abnormal data, the maximum h, of the degree of fitting of the fuzzy values Yx and Yz' will be less than a predetermined level L, such as 0.2. This is because the fuzzy regression outputs Yx and Yz' are located relatively apart from each other such that a low percentage of triangle areas of the fuzzy regression outputs Yx and Yz' are overlapping.

The invention of FIG. 7 is applicable when one result is estimated based on two different inputs obtained under different conditions. When one of the two inputs is abnormal, an abnormal detection can be made by checking the degree of fitting of the regression results based on two different inputs.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A fuzzy identification system comprising:
   a data input port; and,
   a processor coupled to said input port;
   said processor including:
   (a) a regression means for identifying a system by regressing an input/output data received on said data input port using a regression formula based on the method of least squares; and
   (b) a fuzzy regression means for rendering coefficients of said regression formula as fuzzy values in such a manner as to include all the input/output data around said regression formula.

2. A fuzzy data processing device comprising:
   a data input port;
   a first memory coupled to said data input port, said first memory having means for storing therein a first fuzzy regression model in which all coefficients of the fuzzy regression model are denoted as fuzzy values, and with all the data obtained under a first condition being included in said first fuzzy regression model;
   a second memory coupled to said data input port, said second memory having means for storing therein a second fuzzy regression model in which all coefficients of a fuzzy regression model are denoted as fuzzy values, and with all the data obtained under a second condition being included in said second fuzzy regression model; and,
   a processor coupled to said first and second memories;
   said processor comprising:
   (a) a fitting degree calculating means for calculating a degree of fitting of said first fuzzy regression model to said second fuzzy regression model; and
   (b) a maximum detector means for detecting the maximum of the calculated fitting degree, whereby an estimated value ($Y^*$) is obtained.

3. An abnormal fuzzy data detecting device comprising:
   a data input port;
   a first memory coupled to said data input port, said first memory having means for storing therein a first fuzzy regression model in which all coefficients of a fuzzy regression model are denoted as fuzzy values, and with all the data obtained under a first condition being included in said first fuzzy regression model;
   a second memory coupled to said data input port, said second memory having means for storing therein a second fuzzy regression model in which all coefficients of a fuzzy regression model are denoted as fuzzy values. and with all the data obtained under a second condition being included in said said second fuzzy regression model; and,
   a processor coupled to said first and second memories;
   said processor comprising:
   (a) a fitting degree calculating means for calculating a degree of fitting of said first fuzzy regression model to said second fuzzy regression model; and
   (b) a fitting degree comparator means for comparing the calculated fitting degree with a predetermined degree to detect an abnormal condition when said calculated fitting degree is smaller than said predetermined degree.

* * * * *